United States Patent
Huang et al.

(10) Patent No.: US 10,689,999 B2
(45) Date of Patent: Jun. 23, 2020

(54) POWER GENERATION SYSTEM

(71) Applicant: GE AVIATION SYSTEMS, LLC, Grand Rapids, MI (US)

(72) Inventors: Hao Huang, Troy, OH (US); Xiaochuan Jia, Centerville, OH (US); Arthur Vorwerk Radun, Mason, OH (US)

(73) Assignee: GE AVIATION SYSTEMS, LLC, Grand Rapids, MI (US)

( * ) Notice: Subject to any disclaimer, the term of this patent is extended or adjusted under 35 U.S.C. 154(b) by 0 days.

(21) Appl. No.: 15/902,430

(22) Filed: Feb. 22, 2018

(65) Prior Publication Data

US 2019/0257211 A1 Aug. 22, 2019

(51) Int. Cl.
| | | |
|---|---|---|
| *F01D 15/10* | (2006.01) | |
| *F02C 7/32* | (2006.01) | |
| *H02M 3/158* | (2006.01) | |
| *H02P 9/00* | (2006.01) | |
| *H02P 101/30* | (2015.01) | |
| *H02K 7/18* | (2006.01) | |

(52) U.S. Cl.
CPC ............ *F01D 15/10* (2013.01); *F02C 7/32* (2013.01); *H02M 3/1582* (2013.01); *H02P 9/00* (2013.01); *F05D 2220/762* (2013.01); *F05D 2220/764* (2013.01); *H02K 7/1823* (2013.01); *H02P 2101/30* (2015.01)

(58) Field of Classification Search
CPC .................................. F01D 15/10; H02P 9/00
See application file for complete search history.

(56) References Cited

U.S. PATENT DOCUMENTS

| | | | |
|---|---|---|---|
| 7,605,483 B2 | 10/2009 | Kern | |
| 7,609,536 B2* | 10/2009 | Brochu | H02M 7/08 323/255 |
| 8,319,481 B2 | 11/2012 | Morman | |
| 8,492,920 B2 | 7/2013 | Karipides | |
| 8,624,415 B2 | 1/2014 | Koenig | |
| 8,723,349 B2 | 5/2014 | Karipides | |
| 8,885,372 B1* | 11/2014 | Nanut | H02M 1/12 307/11 |
| 2001/0022736 A1* | 9/2001 | Suzuki | H02M 1/4233 363/69 |
| 2010/0060000 A1* | 3/2010 | Scholte-Wassink | F03D 7/0272 290/44 |
| 2010/0102776 A1* | 4/2010 | Uchida | B60K 6/445 320/109 |
| 2012/0068461 A1* | 3/2012 | Luetze | F03D 9/255 290/44 |
| 2013/0062885 A1* | 3/2013 | Taneja | F01D 15/10 290/1 A |
| 2013/0088017 A1* | 4/2013 | Jia | H02K 3/28 290/1 A |

(Continued)

*Primary Examiner* — Sean Gugger
(74) *Attorney, Agent, or Firm* — McGarry Bair PC

(57) ABSTRACT

A power generation system includes an electric generator mechanically driven by a variable speed kinetic source, a first power conversion system connected with an output of the electric generator, and a second power conversion system connected with the output of the electric generator, wherein the electric generator and power conversion systems are adapted to convert the output of the electric generator to a predetermined direct current (DC) voltage.

24 Claims, 5 Drawing Sheets

(56) References Cited

U.S. PATENT DOCUMENTS

| | | | |
|---|---|---|---|
| 2013/0193813 A1* | 8/2013 | Rozman | H02P 9/00 |
| | | | 310/68 D |
| 2013/0232941 A1 | 9/2013 | Huang | |
| 2015/0123463 A1 | 5/2015 | Huang | |
| 2016/0130970 A1 | 5/2016 | Rhynard | |
| 2016/0156291 A1* | 6/2016 | Becker | H02M 7/68 |
| | | | 318/400.26 |
| 2018/0069499 A1* | 3/2018 | Engelken | H02P 25/22 |
| 2018/0134280 A1* | 5/2018 | Takakura | B60K 6/445 |
| 2018/0148043 A1* | 5/2018 | Hokoi | B60L 11/12 |
| 2018/0170350 A1* | 6/2018 | Aoki | B60K 6/445 |
| 2018/0222328 A1* | 8/2018 | Tokito | B60L 9/18 |
| 2018/0287483 A1* | 10/2018 | Henrard | H02M 7/068 |

\* cited by examiner

POWER GENERATION SYSTEM

BACKGROUND OF THE INVENTION

Electric machines, such as electric motors or electric generators, are used in energy conversion. In the aircraft industry, it is common to find an electric generator mechanically connected with a kinetic source, such as a turbine engine, to generate electrical power. The electrical power can further be supplied to aircraft systems by way of a power distribution system. In some instances, the power generated by the electric generator can be converted to different power characteristics prior to supplying the electrical power to the power distribution system or aircraft systems.

BRIEF DESCRIPTION OF THE INVENTION

In one aspect, the disclosure relates to a power generation system including an electric generator mechanically driven by a variable speed kinetic source, a first power conversion system connected with an output of the electric generator and adapted to convert the output of the electric generator to a predetermined direct current (DC) voltage when the electric generator is driven within a predetermined high speed range, and a second power conversion system connected with the output of the electric generator and adapted to convert the output of the electric generator to the predetermined DC voltage when the electric generator is driven below the predetermined high speed range.

In another aspect, the disclosure relates to a power generation system including an electric generator mechanically driven by a variable speed kinetic source, a first power conversion system connected with an output of the electric generator, and a second power conversion system including a boost converter and connected with the output of the electric generator. The electric generator and first power conversion system are adapted to convert the output of the electric generator to a predetermined direct current (DC) voltage when the electric generator is driven in a high speed mode within a predetermined high speed range, and wherein the electric generator and second power conversion system are adapted to convert and boost the output of the electric generator to the predetermined DC voltage when the electric generator is driven in a low speed mode below the predetermined high speed range In yet another aspect, the disclosure relates to a method of operating a power generating system, the method including driving an electric generator by a variable speed kinetic source, wherein a power output of the electric generator is converted by a first power conversion system adapted to convert the output of the electric generator to a predetermined direct current (DC) voltage when the electric generator is driven in a high speed mode within a predetermined high speed range, and wherein the power output of the electric generator is converted by a second power conversion system adapted to boost the converted output to the predetermined DC voltage when the electric generator is driven in a low speed mode.

DESCRIPTION OF EMBODIMENTS OF THE INVENTION

Figure 1:
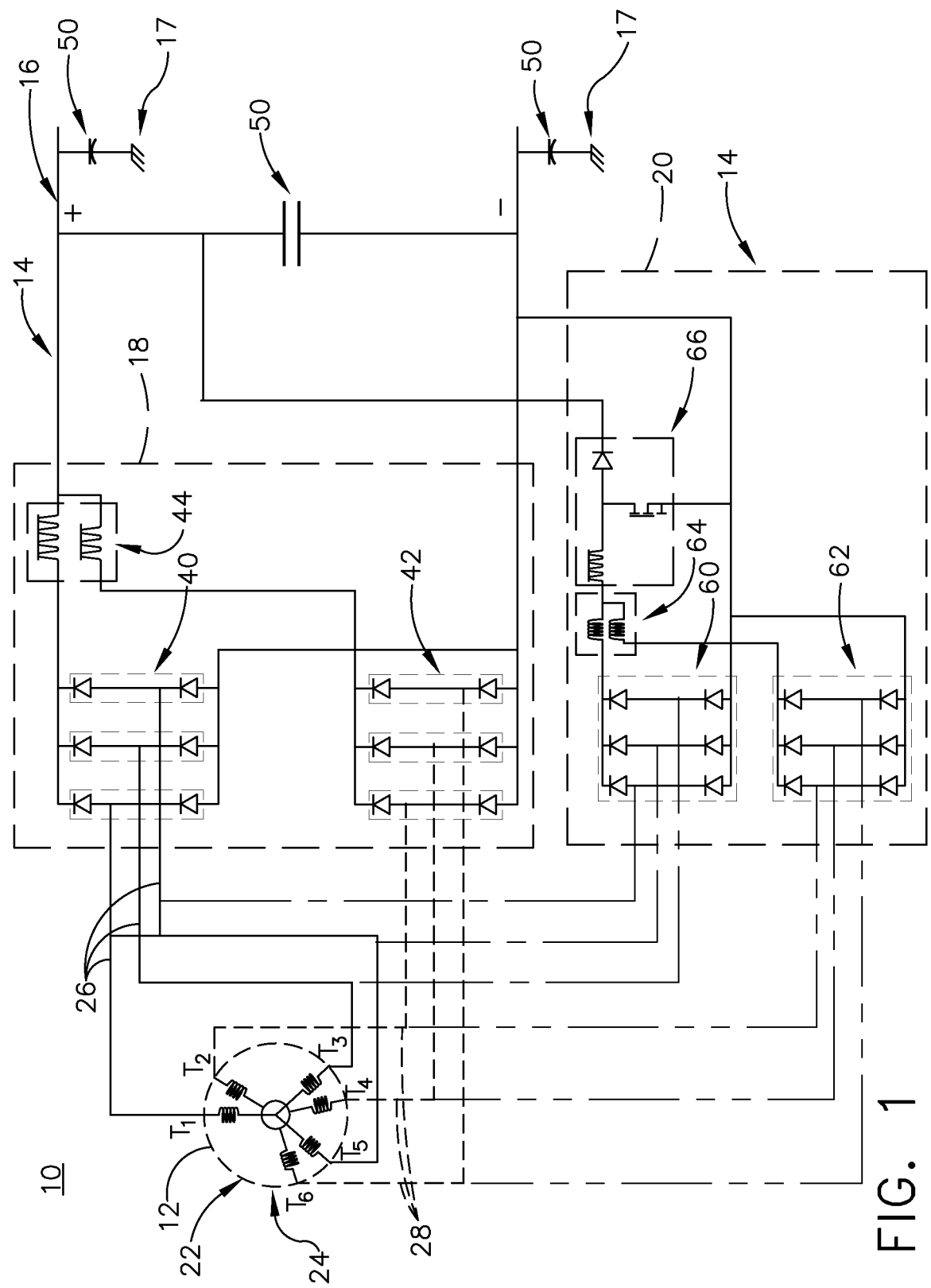
FIG. 1 is a schematic view of a power generator system in accordance with various aspects described herein.

The described aspects of the present disclosure are directed to an electrical power distribution system, which can be used, for example, in an aircraft. While this description is primarily directed toward a power distribution system for an aircraft, it is also applicable to any environment using an electrical system for transmitting power from a power source to an electrical load.

While "a set of" various elements will be described, it will be understood that "a set" can include any number of the respective elements, including only one element. Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

As used herein, a controllable switching element, or a "switch" is an electrical device that can be controllable to toggle between a first mode of operation, wherein the switch is "closed" intending to transmit current from a switch input to a switch output, and a second mode of operation, wherein the switch is "open" intending to prevent current from transmitting between the switch input and switch output. In non-limiting examples, connections or disconnections, such as connections enabled or disabled by the controllable switching element, can be selectively configured to provide, enable, disable, or the like, an electrical connection between respective elements.

The exemplary drawings are for purposes of illustration only and the dimensions, positions, order and relative sizes reflected in the drawings attached hereto can vary. It will be understood that while one aspect of the disclosure is shown in an aircraft environment, the disclosure is not so limited and has general application to electrical power systems in non-aircraft applications, such as other mobile applications and non-mobile industrial, commercial, and residential applications.

FIG. 1 illustrates a schematic view of a power generation system 10 in accordance with aspects of the disclosure. As shown, the power generation system 10 can include a generator 12 with a power output connected with a set of power conversion systems 14, shown as a first or high speed power conversion system 18 and a second or low speed power conversion system 20. Each of the set of power conversion systems 14 can be electrically connected with a power output 16. The power output 16 can be further connected with a power distribution system or a set of electrical loads (not shown), as desired.

In one non-limiting example, the generator 12 can be kinetically or mechanically driven by a variable speed kinetic source, such as one or more spools of a gas turbine engine (not shown). In another non-limiting example, the gas turbine engine can include an aircraft engine, or another rotational source of kinetic energy. In yet another non-limiting example, the source of kinetic energy, such as the gas turbine engine can include a speed-altering system, such as a gearbox, or the like.

The generator 12 can include multiple sets of electrical windings, shown as a first set of windings 22 (e.g. T1, T3, and T5) connected with a first set of generator outputs 26 and a second set of windings 24 (e.g. T2, T4, and T6) connected with a second set of generator outputs 28. In one non-limiting example, the first and second sets of windings 22, 24 can each include three phases of power, wherein each phase is offset by 120 degrees relative to the other phases of the respective windings (e.g. T1, T3, and T5 are each offset from one another by 120 degrees). In another non-limiting example, the first and second sets of windings 22, 24, or phases thereof, can be offset from other set of windings 24, 22 by 30 degrees (e.g. T1 is offset from T2 by 30 degrees). In this sense, the generator 12 can be a six phase electric generator. Additional non-limiting examples of electrical winding or phase configurations can be included.

Rotation of a rotor of the generator 12 relative to a stator operably generates electrical power in the first and second sets of windings 22 or generator outputs 26, 28, which can be conductively supplied to the set of power conversion system 14. As shown, the high speed power conversion system 18 can include a first power converter such as a rectifier, shown as a first diode-based rectifying bridge 40, and a second power converter such as a rectifier, shown as a second diode-based rectifying bridge 42. The first rectifying bridge 40 can receive power supplied by the first set of windings 22 or the first power outputs 26, and can be configured or adapted to rectify alternating current (AC) power generated in the first set of windings 22 to a direct current (DC) power. Similarly, the second rectifying bridge 42 can receive power supplied by the second set of windings 24 or the second power outputs 28, and can be configured or adapted to rectify AC power generated in the second set of windings 24 to a DC power. The rectified DC power by the first and second rectifying bridges 40, 42 can further be supplied to an interface transformer 44 configured or adapted to enable, provide, or operably allow for current sharing between the first and second rectifying bridges 40, 42 to the power output 16.

The low speed power conversion system 20 can include a third power converter such as a rectifier, shown as a third diode-based rectifying bridge 60, and a second power converter such as a rectifier, shown as a fourth diode-based rectifying bridge 62. The third rectifying bridge 60 can receive power supplied by the first set of windings 22 or the first power outputs 26, and can be configured or adapted to rectify AC power generated in the first set of windings 22 to a DC power. Similarly, the fourth rectifying bridge 62 can receive power supplied by the second set of windings 24 or the second power outputs 28, and can be configured or adapted to rectify AC power generated in the second set of windings 24 to a DC power. The rectified DC power by the third and fourth rectifying bridges 60, 62 can further be supplied to an interface transformer 64 configured or adapted to enable, provide, or operably allow for current sharing between the third and fourth rectifying bridges 60, 62. The output of the interface transformer 64 can be connected with a boost converter 66, such as a buck booster, as shown. In this sense, the rectified DC power supplied from the third and fourth rectifying bridges 60, 62 can be operably boosted to a higher DC voltage output than the rectified output, which can then be provided to the power output 16.

Non-limiting aspects of the disclosure can be included wherein the AC power generated in the first and second sets of windings 22, 24 can be substantially equal, or wherein the rectified DC power by the first and second rectifying bridges 40, 42, or by the third and fourth rectifying bridges 60, 62 can be substantially equal. Additional power converting system, rectifiers, or the like, can be included in aspects of the disclosure. Furthermore, additional aspects of the power generation system 10 can be included to, for example, filter, smooth, regulate, or the like, the power supplied to the power output 16. As shown, example power regulation or filtering can be provided by inductive elements 44 and capacitive elements 50 relative to an electrical ground 17.

During operation, the spool of an engine can provide the driving forces to generate electrical power by the generator 12, by way of the first and second sets of windings 22, 24. The power generation system 10 can be further configured, adapted, or operable such that the power generated by the generator 12 is converted by one of the high speed or low speed second power conversion systems 18, 20. As used herein, "high speed" and "low speed" can refer to the speed, rotational speed, speed range, or the like of the driving spool of the engine connected with the generator 12. Thus, in one non-limiting example, a "high speed" spool can be operating at a rotational speed between 14,000 rotations per minute (RPM) to 28,000 RPM, while a "low speed" spool can be operating at a rotational speed less than the "high speed." When the generator 12 is driven by a "high speed" kinetic source, it can be considered operating in a high speed mode. Alternatively, when the generator 12 is driven by a "low speed" kinetic source, it can be considered operating in a low speed mode. Alternative examples of high speed and low speed can be included, designed, or adapted, such that the power generation operations described herein result in the expected results. Furthermore, non-limiting aspects of the disclosure can be included wherein a single connected driving spool can vary the speed, such that the rotational speed varies between the "low speed" and the "high speed," for example during different stages of operation of flight.

The generator 12, the first set of windings 22, the second set of windings 24, the first rectifying bridge 40, the second rectifying bridge 42, the interface transformer 44, or a subset thereof can be designed, selected, adapted, configured, or the like, such that when the driving spool is operating at or above the "high speed" described herein, the generator 12 can supply AC power to the high speed power conversion system 18, which converts and supplies a predetermined amount or an expected supply of DC power at the power output 16. In one non-limiting example, the generator 12 can additionally supply AC power to low speed power conversion system 20 in parallel with the high speed power conversion system 18. In this example, the low speed power conversion system 20 can operably or effectively conduct less power to the power output 16 since at this speed, the low speed power conversion system 20 has a larger impedance, and the boost converter 66 may not operate. In one non-limiting example, the predetermined amount of expected supply of DC power at the power output 16 can be 200 kilowatts at 270 volts DC, 540 volts DC, or any other applicable DC voltage ratings.

In another non-limiting instance, when the driving spool is operating below the minimum "high speed" described herein (e.g. operating at the "low speed"), the generator 12 can supply AC power to the low speed power conversion system 20. In this example, the lower speed operation of the spool can be insufficient for the low speed power conversion system 20 to directly convert and supply DC power with the predetermined amount or expected DC voltage at the power output 16. Thus, the low speed power conversion system 20 rectifies the AC power to DC power, and then boosts the voltage by way of the boost converter 66, to a level sufficient or adequate for the power output 16, such as a 270 volt DC power output 16. In one non-limiting example, the low speed power conversion system 20 may supply less overall power to the power output 16 than the high speed power conversion system 18 does at high speeds, such as 20 kilowatts.

In one non-limiting aspect of the disclosure, the supplying of power from the generator 12 to the high speed or low speed power conversion system 18, 20 can be automatic. In this sense, the first and second sets of outputs 26, 28 from the generator 12 can be continuously connected to each of the high and low speed power conversion systems 18, 20. In this example, when the generator 12 is operating in a high speed output mode, the power rectified and supplied by the high speed power conversion system 18 will be greater than the power supplied by the low speed power conversion system 20, and thus, no power will be rectified, boosted, and supplied by the low speed power conversion system 20. Also in this example, when the generator 12 is operating in the low speed output mode, the power rectified, boosted, and supplied by the low power conversion system 20 will be greater than the power supplied by the high power conversion system 18, and thus, no power will be rectified and supply by the high power conversion system 18. Thus, non-limiting aspects of the disclosure can be included wherein the set of power conversion system 14 are enabled or operate to automatically convert power in either power conversion system 18, 20 based on the spool speed driving the generator 12.

Thus aspects of the disclosure allow for or provide for a single-generator 12 power generation system 10, driven by a single variable speed spool of an engine to supply a predetermined electrical output (e.g. 270 volts DC) regardless of the operating speed of the spool. The high and low speed power conversion systems 18, 20 can be enabled, selected, or operated based on the available power generation, to supply the predetermined electrical output to the power distribution system or electrical loads.

Figure 2:
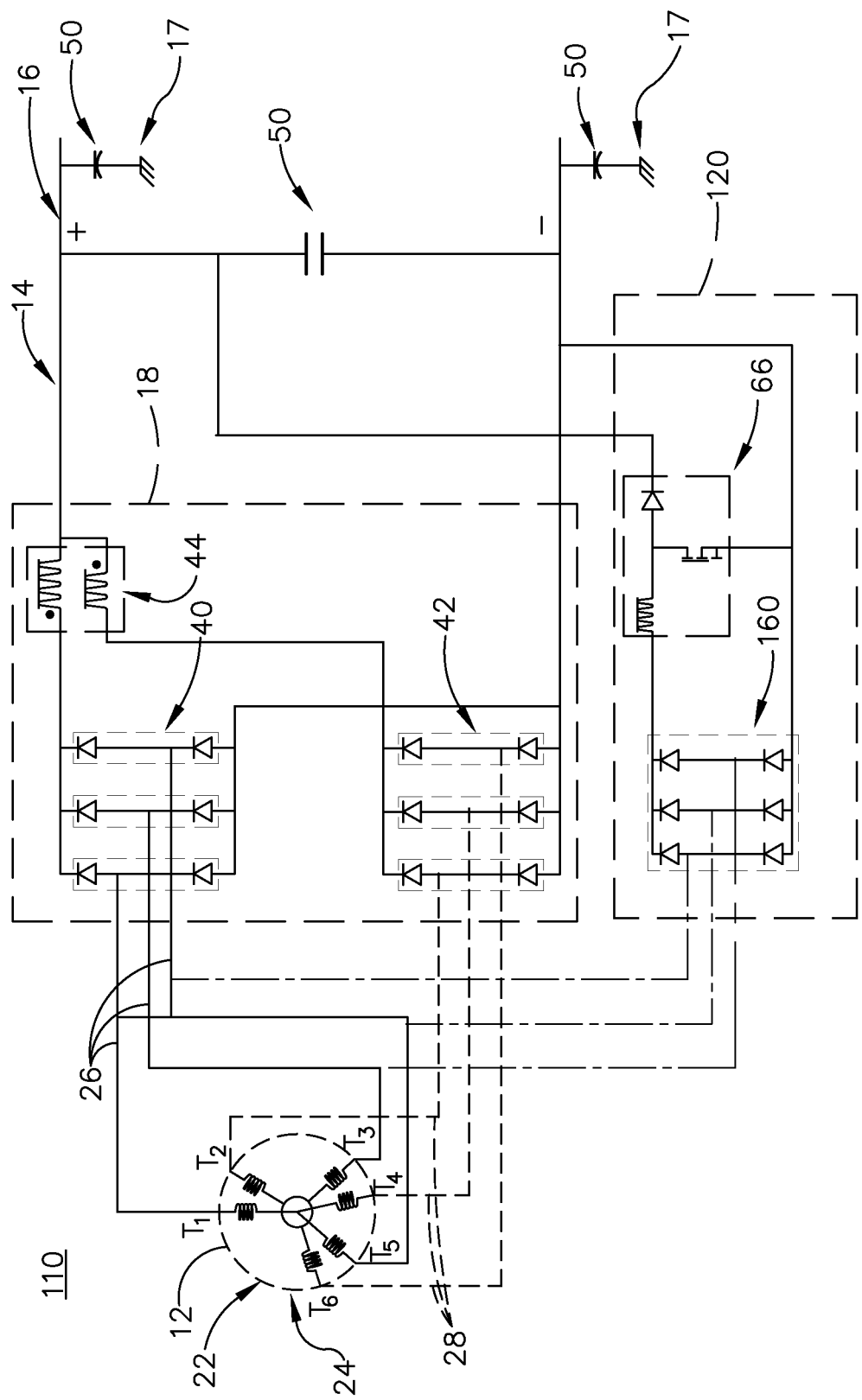
FIG. 2 is a schematic view of another power generator system in accordance with various aspects described herein.

FIG. 2 illustrates another power generation system 110 according to another aspect of the present disclosure. The power generation system 110 is similar to the power generation system 10; therefore, like parts will be identified with like numerals increased by 100, with it being understood that the description of the like parts of the power generation system 10 applies to the power generation system 110, unless otherwise noted. One difference is that the power generation system 110 includes low speed power conversion system 120 only having a single diode-based rectifying bridge 160, compared with the low speed power conversion system 20 of FIG. 1 having two diode-based rectifying bridges 60, 62.

In this example, the single rectifying bridge 160 is shown electrically connected with the first set of outputs 26 of the first set of windings 22. In the illustrated example, the rectified output voltage of the single rectifying bridge 160 can be boosted by the boost converter 66, and further connected with the power output 16. In this sense, non-limiting aspects of the disclosure can be included wherein the power generation system 110 can be operated in a low speed mode, wherein the predetermined or expected power supplied to the power output 16 (e.g. 20 kilowatts or 270 volts DC) can be converted by a single rectifying bridge 160 and boosted by the boost converter, as needed. While the single rectifying bridge 160 is shown electrically connected with the first set of outputs 26 of the first set of windings 22, non-limiting aspects of the disclosure can be included wherein the single rectifying bridge can be alternatively connected with the second set of outputs 28 of the second set of windings 22.

Figure 3:
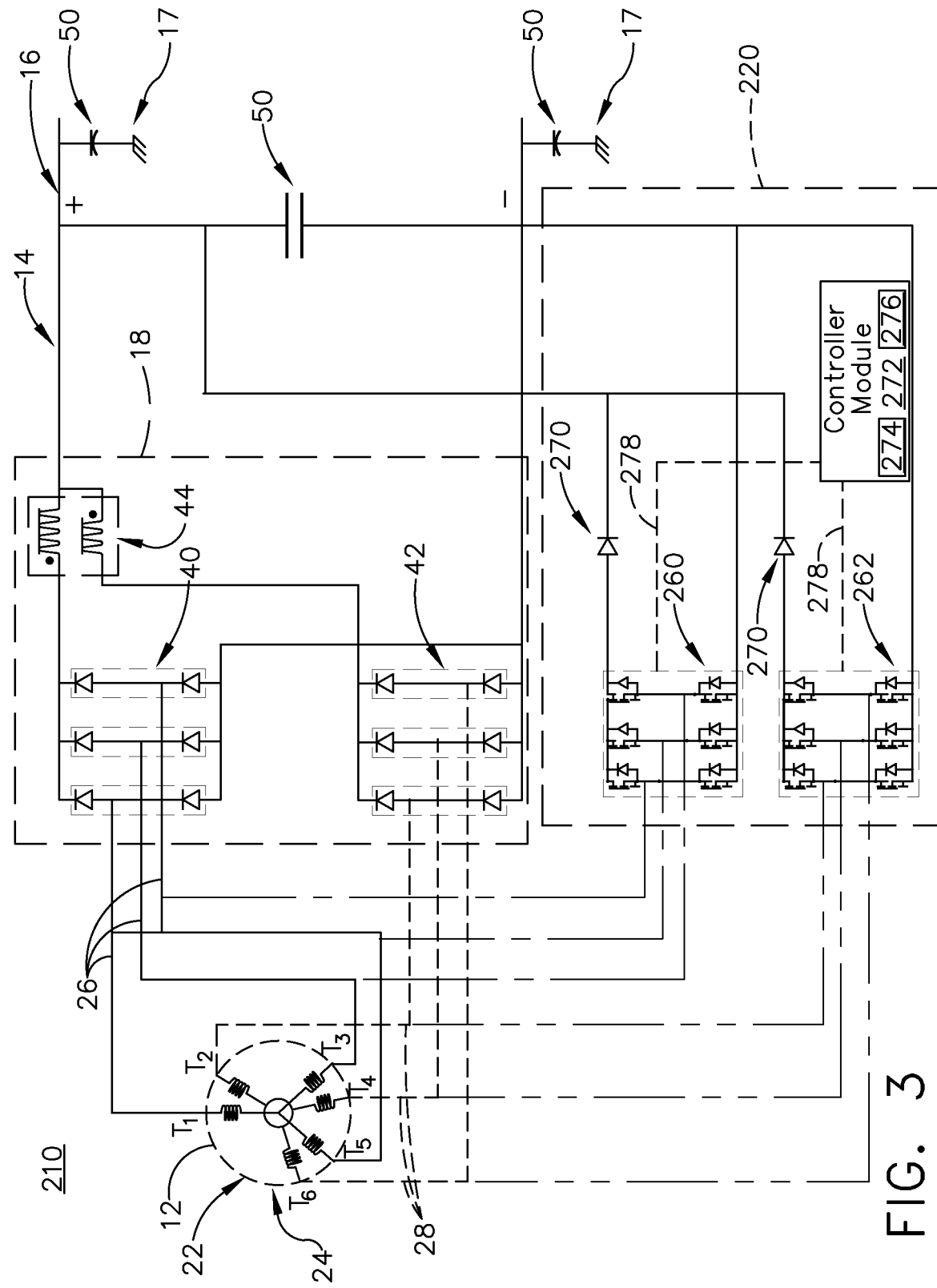
FIG. 3 is a schematic view of yet another power generator system in accordance with various aspects described herein.

FIG. 3 illustrates another power generation system 210 according to another aspect of the present disclosure. The power generation system 210 is similar to the power generation systems 10, 110; therefore, like parts will be identified with like numerals increased by 200, with it being understood that the description of the like parts of the power generation system 10, 110 applies to the power generation system 210, unless otherwise noted. One difference is that the low speed power conversion system 220 of the power generation system 210 includes active rectifiers, such as a first three phase boost mode active rectifier bridge 260 connected with the first set of outputs 26 and a second three phase boost mode active rectifier bridge 262 connected with the second set of outputs 28. Each of the outputs of the respective first and second three phase boost mode active rectifier bridges 260, 262 can be further connected with the power output 16 by way of an optional diode 270. Also as shown, the power generation system 210 can include a controller module 272 having a processor 274 and memory 276 communicatively connected by way of communication lines 278 with each three phase boost mode active rectifier bridge 260, 262 to controllably enable, drive, or operate the three phase boost mode active rectifier bridges 260, 262.

As used herein, the three phase boost mode active rectifier bridges 260, 262 can be controllable, enabled, or configured to operably rectify AC power received while simultaneously boosting the rectified output of the bridge 260, 262. In one non-limiting example, the three phase boost mode active rectifier bridges 260, 262 can operably boost the rectified output of the bridge 260, 262 to the predetermined amount or an expected supply of DC power at the power output 16 (e.g. 270 volt DC). In another non-limiting aspect of the disclosure at least one of the first three phase boost mode active rectifier bridge 260, the second three phase boost mode active rectifier bridge 262, or the controller module can be operably enabled, adapted, or configured to control power sharing between the first and second three phase boost mode active rectifier bridges 260, 262. In another non-limiting aspect of the disclosure, the optional diodes 270 can be included to, for example, prevent a backflow of power supplied by the high speed power conversion system 18 when the driving spool is operating in a high speed mode. In yet another non-limiting aspect of the disclosure, the power generation system 210 of FIG. 3 can be adapted or configured to include only a single three phase boost mode active rectifier bridge 260, 262, such as understood with reference to the configuration of FIG. 2.

Figure 4:
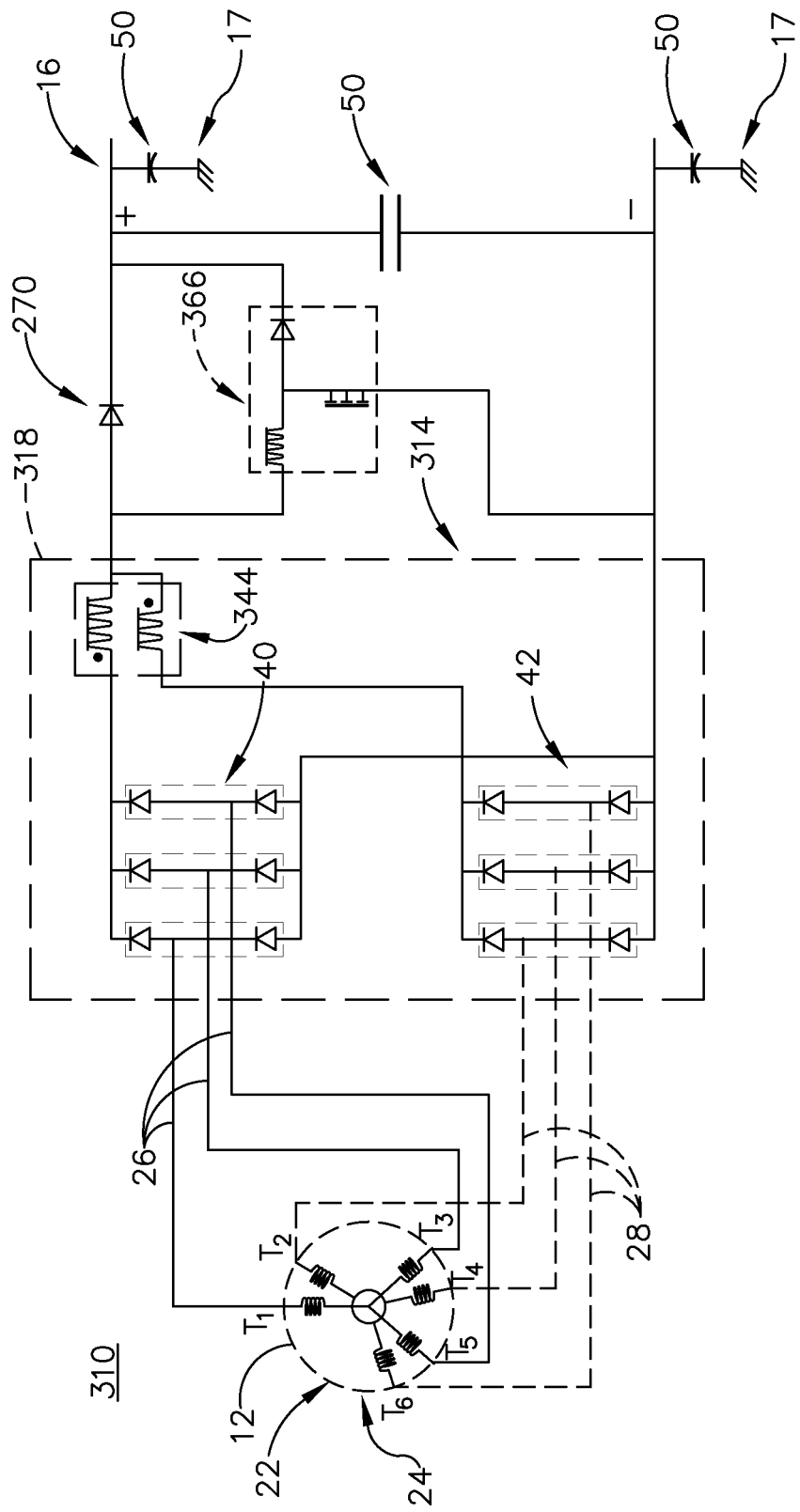
FIG. 4 is a schematic view of yet another power generator system in accordance with various aspects described herein.

FIG. 4 illustrates another power generation system 310 according to another aspect of the present disclosure. The power generation system 310 is similar to the power generation systems 10, 110, 210; therefore, like parts will be identified with like numerals increased by 300, with it being understood that the description of the like parts of the power generation system 10, 110, 210 applies to the power generation system 310, unless otherwise noted. One difference is that the power generation system 310 can only include a single power conversion system 314, 318, similar to the high speed power conversion system 18 of FIG. 1, including an interface transformer 344 connected with the power output 16 by way of a diode 270. The power generation system 310 can further include a boost converter 366 arranged in parallel with the diode 270. In this sense, the power conversion system 310 can operate such that when the spool is operating in a high speed mode, the power conversion system 314, 318 can generate and convert sufficient power to be supplied to the power output 16 (by way of the diode 270 pathway), while when the spool is operating in a low speed mode, the lower output of the power conversion system 314, 318 is further boosted by the boost converter 366 prior to be supplied to the power output 16. In this sense, the configuration and operation of FIG. 4 can eliminate the separate power conversion system 20 of FIG. 1.

Figure 5:
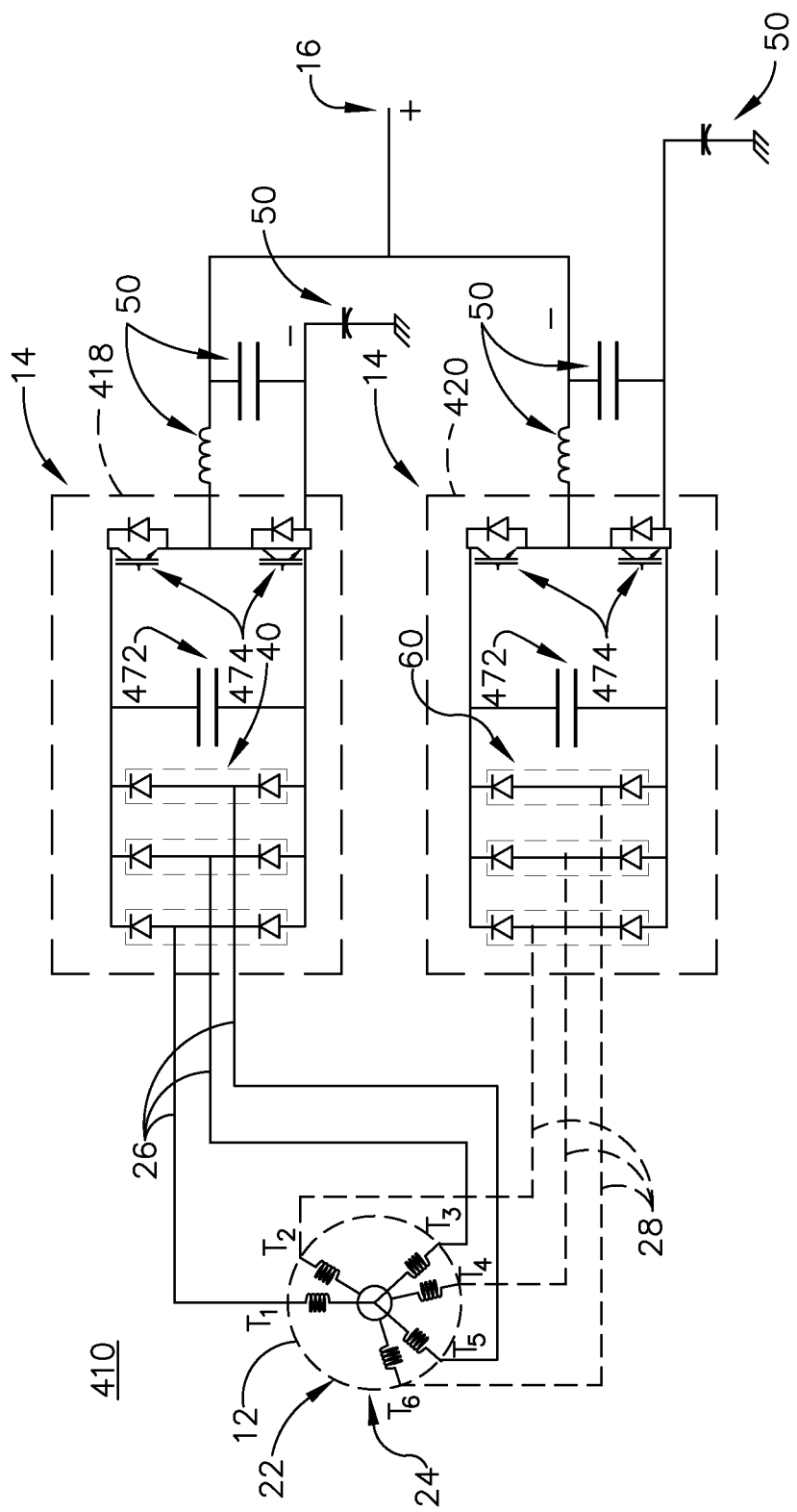
FIG. 5 is a schematic view of yet another power generator system in accordance with various aspects described herein

FIG. 5 illustrates another power generation system 410 according to another aspect of the present disclosure. The power generation system 410 has aspects that are similar to the power generation systems 10, 110, 210, 310; therefore, like parts will be identified with like numerals increased by 400, with it being understood that the description of the like parts of the power generation system 10, 110, 210, 310 applies to the power generation system 410, unless otherwise noted. One difference is that the power generation system 410 has an alternative control purpose. For example, the power generation system 410 can only include a first power conversion system 418 and a second power conversion system 420. The first power conversion system 418 can include a first rectifying bridge 40 connected with the first set of outputs 26. A capacitor 472 is connected between the outputs of the first rectifying bridge 40, which is further connected with at least one DC to DC boost converter 474, shown as a pair of boost or DC/DC converters 474 that can either "buck" (e.g. step down) or "boost" (e.g. step up) its corresponding rectified voltage. The output of the DC/DC converter 474 can further be connected with filtering elements 50 or the power output 16.

Also as shown, the second power conversion system 420 can include a second rectifying bridge 60 connected with the second set of outputs 28. Similar to the first power conversion system 418, a capacitor 472 is connected between the outputs of the second rectifying bridge 60, which is further connected with at least one DC to DC converter 474 that can either buck (step down) or boost (step up) its corresponding rectified voltage. The output of the DC/DC converter 474 can further be connected with filtering elements 50 or the power output 16. In this sense, the output of the first power conversion system 418 is in parallel with the second power conversion system 420. In this configuration, the power conversion system 410 will provide improved transient voltage regulation of the DC output 16 during load transients compared to a system without the DC/DC converters. In another aspect, if the DC/DC converters 474 step down the rectified voltage the output voltage of the generator 12 and rectifier 40, 60 will have a voltage greater than the final DC voltage. This in turn reduces the generator 12 and rectifier currents reducing the generator wires or cables going from the generator 12 to the rectifier 40, 60 and the rectifier 40, 60 to the DC/DC converter 474. Since the generator 12 is often physically positioned remote from the converter (such as on an engine located on the aircraft wing) the reduced wire or cable weight provides a weight reduction in addition to providing an improved DC voltage transient response to load transients. Non-limiting aspects of the disclosure can be included wherein the DC/DC converters or switch technology can include any DC/DC converters and semiconductor switches.

Many other possible aspects and configurations in addition to that shown in the above figures are contemplated by the present disclosure. For example, one aspect of the present disclosure can include controllable or selectively operable switching operations adapted supply outputs 26, 28 from the generator to a respective power conversion system. In another non-limiting example, any number of the passive rectifying (e.g. diodes) elements can be interchangeable with active rectifying elements (controllable solid state switches or transistors), or vice versa. Additionally, the design and placement of the various components such as valves, pumps, or conduits can be rearranged such that a number of different in-line configurations could be realized.

The aspects disclosed herein provide a power generation system utilizing a single generator driven by a variable speed rotational source of kinetic motion, such as the spool of an aircraft engine. As described, the single power generation system can be operable to generate an expected power output or voltage regardless of the actual rotational speed of the kinetic motion source. The adaption of using a second or alternative power conversion system adapted for low speed sources prevent the magnetic saturation of the generator over the variable speed range by using the boost converter, allowing the single generator to be used for both high speed and low speed operations.

One advantage that can be realized in the above aspects is that the system enables a single generator design to be operable with either or both a high speed and low speed variable kinetic driving source. By utilizing a single generator with multiple conversion systems, as opposed to multiple generators adapted for, respectively, high speed or low speed sources, an aircraft can reduce system weight. Furthermore because, in general, low spool generators tend to be heavier electric machines compared with high speed spool generators because they operate over a wider speed range, if less power is required at low speeds, this patent can reduce the weight of a low spool generator. Moreover when utilizing active rectifiers such as solid state devices, the power conversion systems can have lower failure rates, and increased reliability. When designing aircraft components, important factors to address are size, weight, and reliability. The resulting aspects of the disclosure have a lower weight, smaller sized, increased performance, and increased reliability system. Reduced weight and size correlate to competitive advantages during flight.

To the extent not already described, the different features and structures of the various aspects may be used in combination with each other as desired. That one feature may not be illustrated in all of the aspects is not meant to be construed that it may not be, but is done for brevity of description. Thus, the various features of the different aspects may be mixed and matched as desired to form new aspects, whether or not the new aspects are expressly described. All combinations or permutations of features described herein are covered by this disclosure.

This written description uses examples to disclose the aspects of the disclosure, including the best mode, and also to enable any person skilled in the art to practice the aspects of the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power generation system, comprising:
an electric generator configured to be mechanically driven by a variable speed gas turbine engine;
a first power conversion system having a first rectifying bridge and a second rectifying bridge connected with an output of the electric generator and adapted to convert the output of the electric generator to a predetermined direct current (DC) voltage when the electric generator is driven by the variable speed kinetic source within a predetermined high speed range, and a first interface transformer connected with an output of the first rectifying bridge and an output of the second rectifying bridge, the first interface transformer configured to operably allow for current sharing between the first rectifying bridge and the second rectifying bridge; and
a second power conversion system having a third rectifying bridge and a fourth rectifying bridge connected with the output of the electric generator and adapted to convert the output of the electric generator to the predetermined DC voltage when the electric generator is driven by the variable speed kinetic source below the predetermined high speed range, and a second interface transformer connected with an output of the third rectifying bridge and an output of the fourth rectifying bridge, the second interface transformer configured to operably allow for current sharing between the third rectifying bridge and the fourth rectifying bridge.

2. The power generation system of claim 1 wherein the high speed range is between 14,000 rotations per minute and 28,000 rotations per minute.

3. The power generation system of claim 1 wherein the variable speed gas turbine engine includes a spool configured to mechanically drive the electric generator.

4. The power generation system of claim 1 wherein the electric generator is adapted to output alternating current (AC).

5. The power generation system of claim 4 wherein at least one of the rectifying bridges is a three phase boost mode active rectifier bridge.

6. The power generation system of claim 1 wherein the second power conversion system includes a boost converter to boost a converted power to the predetermined DC voltage.

7. The power generation system of claim 1 adapted to selectively utilize the respective first or second power conversion system based on the variable speed of the kinetic source.

8. The power generation system of claim 1 wherein the electric generator is a six phase electric generator.

9. The power generation system of claim 8 wherein the second power conversion system converts only three phases of power output of the six phase electric generator.

10. The power generation system of claim 1 wherein the first and second power conversion systems are in parallel.

11. The power generation system of claim 1 wherein the first rectifying bridge and the second rectifying bridge are arranged in parallel to define a first power conversion system power output.

12. The power generation system of claim 11 wherein the third rectifying bridge and the fourth rectifying bridge are arranged in parallel to define a second power conversion system power output.

13. The power generation system of claim 12 wherein the first power conversion system power output and the second power conversion system power output are arranged in parallel.

14. The power generation system of claim 1 wherein the first rectifying bridge is configured to receive a first output of the electric generator by way of a first set of generator windings, and wherein the second rectifying bridge is configured to receive a second output of the electric generator by way of a second set of generator windings.

15. The power generation system of claim 14 wherein the third rectifying bridge is configured to receive the first output of the electric generator by way of the first set of generator windings, and wherein the fourth rectifying bridge is configured to receive the second output of the electric generator by way of the second set of generator windings.

16. A power generation system, comprising:
an electric generator configured to be mechanically driven by a variable speed gas turbine engine;
a first power conversion system having a first rectifying bridge and a second rectifying bridge connected with an output of the electric generator and a first interface transformer connected with an output of the first rectifying bridge and an output of the second rectifying bridge, the first interface transformer configured to operably allow for current sharing between the first rectifying bridge and the second rectifying bridge; and
a second power conversion system having a third rectifying bridge and a fourth rectifying bridge connected with the output of the electric generator, a boost converter, and a second interface transformer connected with an output of the third rectifying bridge and an output of the fourth rectifying bridge, the second interface transformer configured to operably allow for current sharing between the third rectifying bridge and the fourth rectifying bridge, and an output of the second interface transformer connected with the boost converter;

wherein the electric generator and first power conversion system are adapted to convert the output of the electric generator to a predetermined direct current (DC) voltage when the electric generator is driven in a high speed mode within a predetermined high speed range, and wherein the electric generator and second power conversion system are adapted to convert and boost the output of the electric generator to the predetermined DC voltage when the electric generator is driven in a low speed mode below the predetermined high speed range.

17. The power generation system of claim 16 wherein the high speed range is between 14,000 rotations per minute and 28,000 rotations per minute.

18. The power generation system of claim 16 wherein the variable speed gas turbine engine includes a spool configured to mechanically drive the electric generator.

19. The power generation system of claim 16 wherein the electric generator is adapted to output alternating current (AC).

20. The power generation system of claim 19 wherein at least one of the rectifying bridges is a three phase boost mode active rectifier bridge.

21. The power generation system of claim 16 adapted to selectively utilize the respective first or second power conversion system based on the variable speed of the kinetic source.

22. The power generation system of claim 16 wherein the first and second power conversion systems are in parallel.

23. A method of operating a power generating system, the method comprising:

driving an electric generator by a variable speed kinetic source;

converting a power output of the electric generator by way of a first power conversion system having a first rectifying bridge, a second rectifying bridge, and a first interface transformer connected with an output of the first rectifying bridge and an output of the second rectifying bridge, the first interface transformer configured to operably allow for current sharing between the first rectifying bridge and the second rectifying bridge, to a predetermined direct current (DC) voltage when the electric generator is driven in a high speed mode within a predetermined high speed range;

converting the power output of the electric generator by way of a second power conversion system having a third rectifying bridge, a fourth rectifying bridge, and a second interface transformer connected with an output of the third rectifying bridge and an output of the fourth rectifying bridge, the second interface transformer configured to operably allow for current sharing between the third rectifying bridge and the fourth rectifying bridge, to the predetermined DC voltage when the electric generator is driven in a low speed mode; and operably supplying the predetermined DC voltage from the first power conversion system or the second power conversion system to a common output.

24. The method of claim 23 wherein the electric generator is a six phase electric generator and converting by the first and second power conversion systems convert six phases of the electric generator.

* * * * *